United States Patent
Wong

(10) Patent No.: US 10,567,014 B2
(45) Date of Patent: Feb. 18, 2020

(54) HIGH POWER TRANSMISSION USING MULTI-TONE SIGNALS

(71) Applicant: The Johns Hopkins University, Baltimore, MD (US)

(72) Inventor: Kenaz S. Wong, Marriottsville, MD (US)

(73) Assignee: The Johns Hopkins University, Baltimore, MD (US)

( * ) Notice: Subject to any disclaimer, the term of this patent is extended or adjusted under 35 U.S.C. 154(b) by 89 days.

(21) Appl. No.: 15/689,408

(22) Filed: Aug. 29, 2017

(65) Prior Publication Data

US 2019/0028126 A1  Jan. 24, 2019

Related U.S. Application Data

(60) Provisional application No. 62/414,851, filed on Oct. 31, 2016.

(51) Int. Cl.
 *H04B 1/04* (2006.01)

(52) U.S. Cl.
 CPC ....... *H04B 1/04* (2013.01); *H04B 2001/0416* (2013.01)

(58) Field of Classification Search
 CPC .............. H04B 1/04; H04B 2001/0416; H04B 1/1036; H04B 1/707; H03F 1/486; H03F 3/211; H03F 3/24; H04L 27/2601; H04J 3/0632
 See application file for complete search history.

(56) References Cited

U.S. PATENT DOCUMENTS

| | | | |
|---|---|---|---|
| 5,570,350 A * | 10/1996 | Myer | H04B 1/1036 370/335 |
| 6,529,715 B1 * | 3/2003 | Kitko | H03F 1/486 330/124 R |
| 6,686,879 B2 | 2/2004 | Shattil | |
| 6,781,976 B1 * | 8/2004 | Sonning | H04J 3/0632 370/335 |
| 7,539,269 B2 | 5/2009 | Vadde et al. | |
| 7,907,894 B2 | 3/2011 | Avellan et al. | |
| 8,285,203 B2 | 10/2012 | Avellan et al. | |
| 8,340,574 B2 | 12/2012 | Avellan et al. | |
| 8,509,205 B2 | 8/2013 | Jain et al. | |
| 9,083,426 B1 | 7/2015 | Freedman et al. | |
| 2006/0013182 A1 * | 1/2006 | Balasubramanian | H04L 5/026 370/343 |
| 2008/0187035 A1 * | 8/2008 | Nakamura | H03F 1/0288 375/232 |

* cited by examiner

*Primary Examiner* — Jianxun Yang
(74) *Attorney, Agent, or Firm* — Noah J. Hayward

(57) ABSTRACT

Various apparatuses and methods for high power transmission using multi-tone signals are provided. One example method includes providing, by signal processing circuitry having a plurality of processor outputs, a data stream for each processor output, and modulating each data stream with a carrier tone to generate modulated data streams as incoherent signals. The example method may also include forming a multi-tone signal based on the modulated data streams, and outputting the multi-tone signal on each of the processor outputs for provision, after being amplified by respective amplifiers, to a power combiner for coherent combination of the multi-tone signals by the power combiner and wireless transmission via an antenna.

20 Claims, 3 Drawing Sheets

HIGH POWER TRANSMISSION USING MULTI-TONE SIGNALS

CROSS-REFERENCE TO RELATED APPLICATION

This application claims priority to and the benefit of prior-filed, U.S. Provisional Application Ser. No. 62/414,851 filed on Oct. 31, 2016, the entire contents of which are hereby incorporated herein by reference.

STATEMENT OF GOVERNMENTAL INTEREST

This invention was made with Government support under contract number N00024-13-D-6400 awarded by the Naval Sea Systems Command (NAVSEA). The Government has certain rights in the invention.

TECHNICAL FIELD

Example embodiments generally relate to signal transmission related to radar, electronic warfare (EW) and communications technology and, more particularly, relate to techniques for improving power output in wireless systems.

BACKGROUND

Many systems require that multiple signals, or different carriers, be transmitted simultaneously. However, when these signals are combined for transmission via a single antenna, the power of the signal to the antenna can be substantially degraded, particularly at the combiner. Compensations are therefore required to remedy these high power losses through the combiner. In this regard, additional hardware, such as additional amplifiers may be required to boost the signal power back to acceptable levels for transmission. In addition to increasing cost and complexity, the introduction of such additional hardware can also have negative impacts by introducing heat, noise, and additional losses

BRIEF SUMMARY OF SOME EXAMPLES

Example apparatuses and methods for high power transmission using multi-tone signals are provided. One example apparatus may be a wireless transmitter. The wireless transmitter may comprise signal processing circuitry having a plurality of processor outputs, and a plurality of amplifiers. Each amplifier may have a respective amplifier input and a respective amplifier output. Each amplifier input may be operably connected to one of the processor outputs. The example wireless transmitter may also comprise a power combiner having a plurality of power combiner inputs and a power combiner output. Each of the power combiner inputs may be operably connected to one of the amplifier outputs. The wireless transmitter may also comprise an antenna having an antenna input. The antenna input may be operably connected to the power combiner output. The signal processing circuitry may be configured to provide a data stream for each processor output and modulate each data stream with a carrier tone to generate modulated data streams as incoherent signals. The signal processing circuitry may also be configured to form a multi-tone signal based on the modulated data streams, and output the multi-tone signal on each of the processor outputs for provision, after being amplified by the amplifier, to the power combiner for coherent combination of the multi-tone signals by the power combiner and wireless transmission via the antenna.

Another example apparatus may be another example wireless transmitter. In this regard, the wireless transmitter may comprise signal processing circuitry having a first processor output and a second processor output, and a first amplifier and a second amplifier. The first amplifier may have a first amplifier input and a first amplifier output. The second amplifier may have a second amplifier input and a second amplifier output. The first amplifier input may be operably connected to the first processor output and the second amplifier input may be operably connected to the second processor output. The wireless transmitter may further comprise a power combiner having a first power combiner input, a second power combiner input, and a power combiner output. The first power combiner input may be operably connected to the first amplifier output and second power combiner input may be operably connected to the second amplifier output. The example wireless transmitter may also comprise an antenna having an antenna input. The antenna input may be operably connected to the power combiner output. The signal processing circuitry may be configured to provide a first data stream for the first processor output and provide a second data stream for the second processor output, and modulate the first data stream with a first carrier tone to generate a first modulated data stream and modulate the second data stream with a second carrier tone to generate a second modulated data stream. The first modulated data stream and the second modulated data stream may be incoherent signals. The signal processing circuitry may also be configured to form a multi-tone signal based on the first modulated data stream and the second modulated data stream, and output the multi-tone signal on the first processor output and the second processor output for provision, after being amplified by the amplifier, to the power combiner for coherent combination of the multi-tone signals by the power combiner and wireless transmission via the antenna.

Another example embodiment is a method for high power transmission using multi-tone signals. In this regard, the example method may comprise providing, by signal processing circuitry having a plurality of processor outputs, a data stream for each processor output, and modulating each data stream with a carrier tone to generate modulated data streams as incoherent signals. The example method may further comprise forming a multi-tone signal based on the modulated data streams, and outputting the multi-tone signal on each of the processor outputs for provision, after being amplified by respective amplifiers, to a power combiner for coherent combination of the multi-tone signals by the power combiner and wireless transmission via an antenna.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
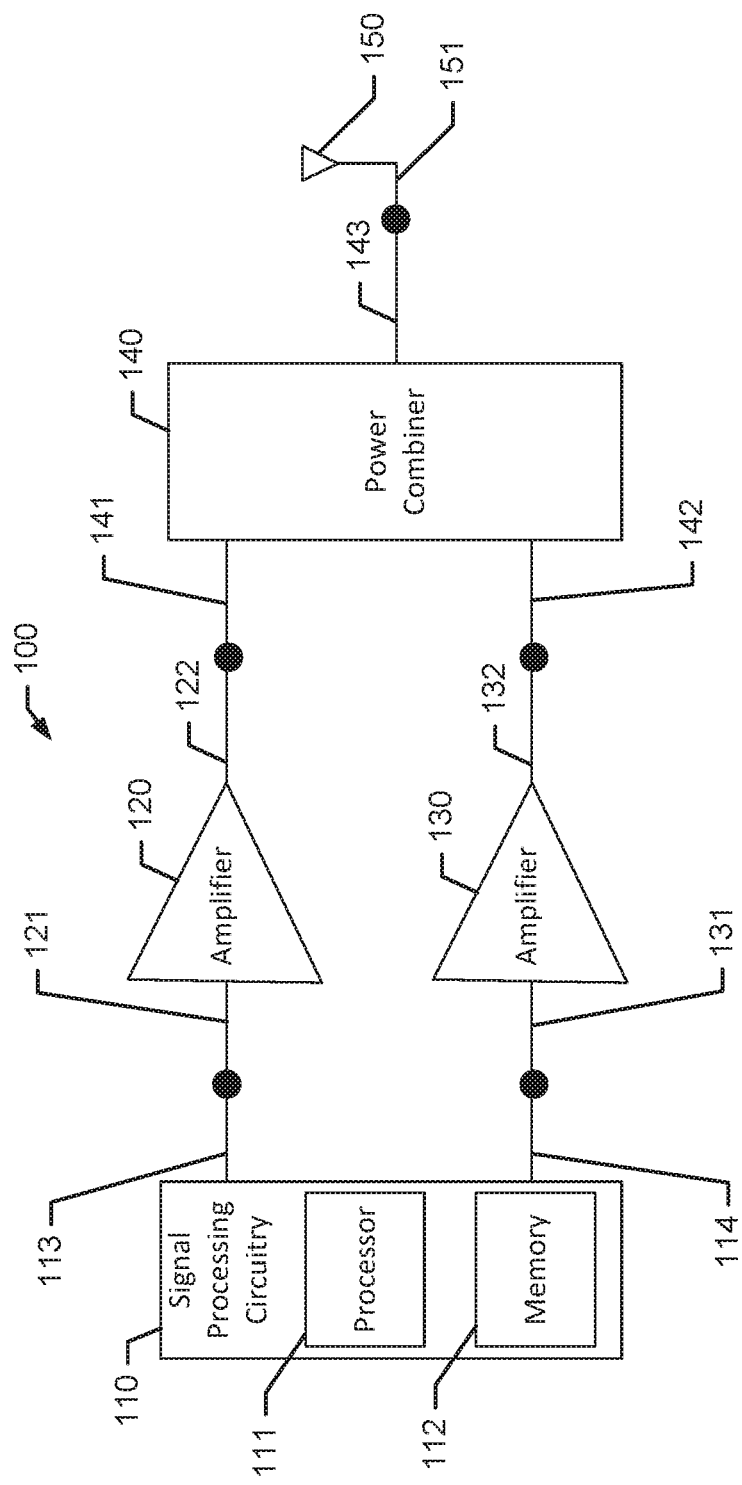
FIG. 1 shows a diagram of an example two-channel transmitter with an antenna for high power transmission using multi-tone signals according to some example embodiments.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout.

As used herein the term "or" is used as the logical or where any one or more of the operands being true results in the statement being true. As used herein, the phrase "based on" as used in, for example, "A is based on B" indicates that B is a factor that determines A, but B is not necessarily the only factor that determines A. As used herein, the phrase "operably connected" as used in, for example, "A is operably connected B" indicates that A and B are directly or indirectly connected such that operational events at A contribute to results at B and operational events at B contribute to results at A.

According to various example embodiments, an example transmitter for high power transmission using multi-tone signals is provided. In this regard, many wireless systems, such as broadband transmission systems, may require transmission of multiple, simultaneous, incoherent signals to be radiated from a single antenna. Often, in such systems, the signal power level delivered to the antenna can be undesirably attenuated relative to a signal power level that would be transmitted as an individual signal. A substantial portion of the attenuation and losses, when multiple, simultaneous, incoherent signals are being transmitted, can occur in the power combining components. The power combining components may operate to combine the signals on multiple inputs of the components for output to the antenna. An example of such power combining components, may be a Wilkinson combiner.

Example embodiments described herein can operate to combine multiple incoherent signals without realizing the substantial attention in power level that occurs in conventional systems. As such, example embodiments may result in cost reductions for systems since additional hardware may not be needed to compensate for power level attenuation. This may also reduce the complexity of the transmitter design. Additionally, other operational benefits may be realized such as reduced thermal impacts and longer component life.

FIG. 1 shows an example embodiment in the form of an example two-channel wireless transmitter 100. The wireless transmitter 100 may comprise signal processing circuitry 110, amplifiers 120, 130, a power combiner 140, and an antenna 150.

The signal processing circuitry 110 may comprise a processor 111 and a memory 112. The signal processing circuitry 110, as further described below, may be configured to receive data in the form of multiple data sets for transmission on separate channels simultaneously. Further, the signal processing circuitry 110 may prepare the data sets for wireless transmission as a multi-tone signal as described herein. In this regard, the data sets may be received by the signal processing circuitry 110 from another entity via one or more inputs (not shown) or from, for example, memory 112. The signal processing circuitry 110 may prepare the data sets for output as a modulated data streams on respective processor outputs of the signal processing circuitry 110. In this regard, the signal processing circuitry 110 may include two outputs 113 and 114.

The outputs 113, 114 of the signal processing circuitry 110 may be operably connected to amplifier input 121 of amplifier 120 and amplifier input 131 of amplifier 130, respectively. Amplifiers 120, 130 may be configured amplify or increase the power level of a signal that is provided to an input of the amplifiers. The amplifiers 120, 130 may be configured to operate in a non-linear mode, which may include a compressed mode or a saturated mode. In this regard, the signal provided on processor output 113, and therefore provided to amplifier input 121, may be amplified by amplifier 120 and provided to amplifier output 122. Amplifier 130 may operate in the same manner with respect to processor output 114, amplifier input 131, and amplifier output 132. According to some example embodiments, the amplifiers 120, 130 may be high power amplifiers (HPAs). Further, according to some example embodiments, the amplifiers 120, 130 may be a last stage of each transmit channel prior to the power combiner 140 in the wireless transmitter 100. Accordingly, amplifier output 122 may be operably connected to power combiner input 141 and amplifier output 132 may be operably connected to power combiner input 142.

The power combiner 140 may be configured to combine signals provided to the power combiner inputs 141 and 142 and generate an output signal on the power combiner output 143 to the antenna 150. According to some example embodiments, the power combiner 140 may be a Wilkinson combiner. In this regard, the power combiner 140 may be comprised of passive components. According to some example embodiments, the power combiner 140 may include quarter-wave transformers. The power combiner 140 may be configured to exhibit high isolation between inputs or channels that are being combined. The power combiner output 143 may be operably connected to the antenna input 151 of the antenna 150, which may operate as a single broadband antenna.

With respect to the operation of the power combiner 140 as a Wilkinson combiner, if incoherent signals, where incoherence means that the signals are different (more than nominally different) in at least one of amplitude, frequency, or phase, are provided to the inputs, a significant attenuation in the power level is realized at the output of the combiner 140. In this regard, the signal at the amplifier input 121 may be ($f_1$, $P_1$) and the signal at the amplifier input 131 may be ($f_2$, $P_1$), where $f_1$ is a first carrier frequency, $f_2$ is a second carrier frequency, and $P_1$ is an input power level for both signals. The amplifier outputs 122, 132 may have signals ($f_1$, $P_2$) and ($f_2$, $P_2$), respectively, where $P_2$ is an amplified power level and the outputs of the amplifiers may be saturated at $P_2$. Further, some harmonics may be introduced to the signals at the outputs of the amplifiers 120, 130, as well. Since these signals to be provided to the power combiner 140 are incoherent, the power level of each combined signal at the output 143 may be reduced by 10 log(N) dB, where N is the number signals. In this example, N=2, and therefore the attenuation in power level is 10 log(2)=3 dB or a loss of ½ of the power for each signal. Thus the signal at the power combiner output 143 may be ($f_1$, $P_2/2$; $f_2$, $P_2/2$; harmonics). However, if coherent signals are provided to the power combiner 140, where coherence means that the signals are identical (or substantially identical) in amplitude, frequency, and phase, the signals may be combined with a very small attenuation in power level as further described below.

According to various example embodiments, the signal processing circuitry 110 may be configured to consider incoherent signals and form a multi-tone signal based on the incoherent signals, where the multi-tone signal can be provided as an input on all of the inputs to the power combiner 140. Since this same multi-tone signal may be provided on all of the inputs of power combiner 140, coherence may be realized, and a nearly full power level may be provided at the output 143 and to the antenna 150.

As such, in the two-channel wireless transmitter 100, a two-tone operation may be implemented where the signal processing circuitry 110 may provide two different signals (one for each channel) to each amplifier 120, 130. In this regard, the signal provided to amplifier input 121 may be ($f_1$, $P_1/2$; $f_2$, $P_1/2$) and the signal provided to amplifier input 131 may also be ($f_1$, $P_1/2$; $f_2$, $P_1/2$). In other words, the signal processing circuitry 110 may inject a multi-tone (here, two-tone) signal into each of the amplifiers 120, 130 as half of a predetermined single tone power. By reducing the power in this manner, full total power output of the amplifiers 120, 130 may be maintained because, for example, the amplifiers 120, 130 may be operating in a non-linear mode. Further, because the amplifiers 120, 130 are operating in non-linear mode, the outputs of the amplifiers 120, 130 may exhibit each of the fundamental carrier signals (with encoded data) with harmonics and intermodulation distortion (IMD) which may be caused by operation on the multi-tone signals. Due to, for example, the IMD, some relatively small amount of power loss may be realized. As such, the outputs of the amplifiers 120, 130 may have signals with power levels that are slightly less than half power due to IMD and harmonics represented by ($f_1$, $\sim P_2/2$; $f_2 \sim P_2/2$; IMD; harmonics). Accordingly, as mentioned above, because the identical (or substantially identical) signals are provided to the inputs of the power combiner 140 from the amplifiers 120, 130, the signals can be coherently combined. Therefore, the substantial losses associated with incoherent signal combination can be avoided.

Figure 2:
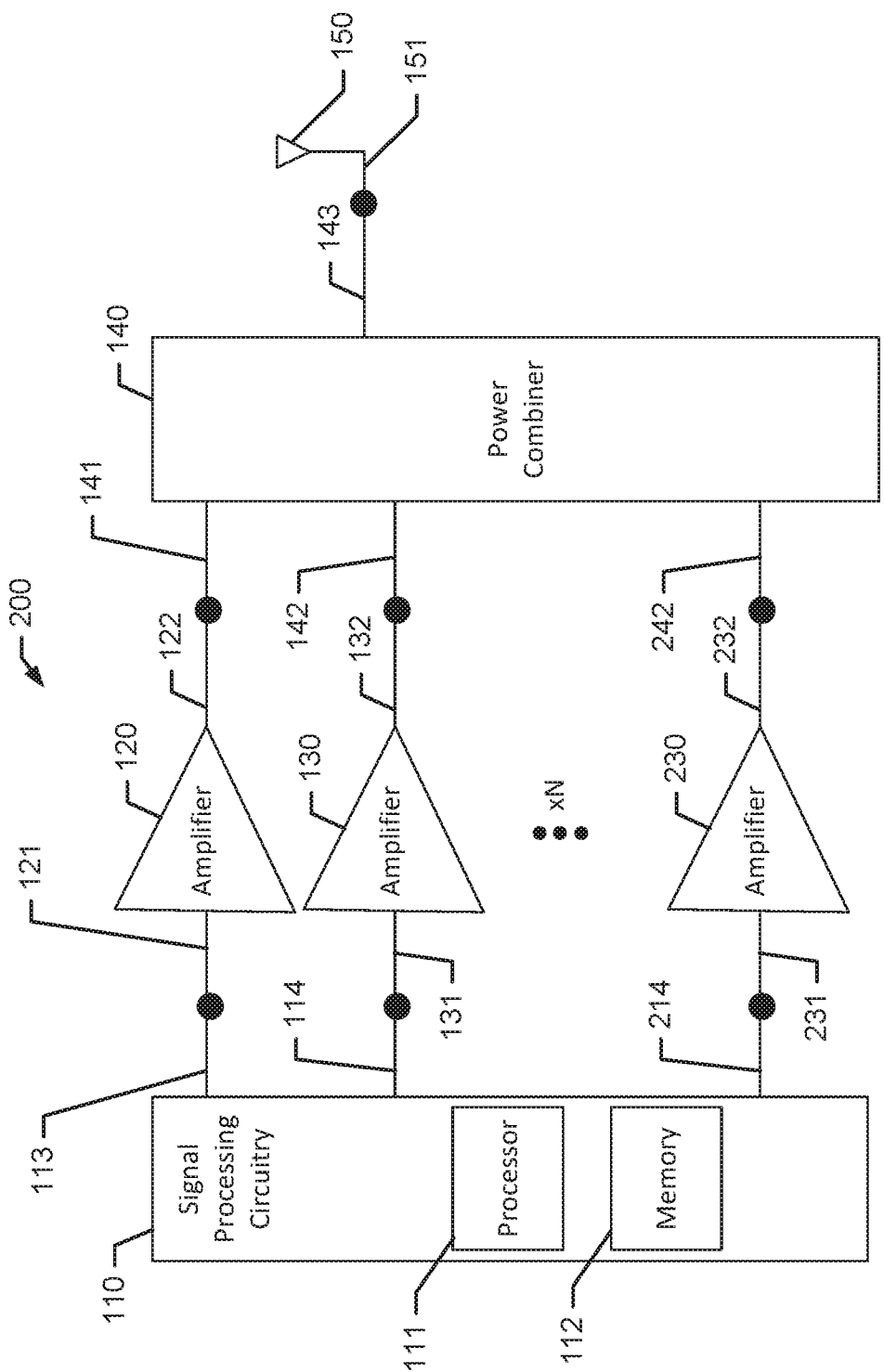
FIG. 2 shows a diagram of an example multi-channel transmitter with an antenna for high power transmission using multi-tone signals according to some example embodiments.

FIG. 2 shows an example variation to the wireless transmitter 100 in the form of a wireless transmitter 200 that is operated with respect to any number of channels N. In this regard, the signal processing circuitry 110 may have N processor outputs, including processor outputs 113, 114, and 214. The wireless transmitter may include N amplifiers, including amplifiers 120, 130, and 230, having amplifier inputs 121, 131, and 231 and amplifier outputs 122, 132, and 232, respectively. Further, the power combiner 140 may have N inputs including, power combiner inputs 141, 142, and 242. In this regard, the power combiner 140 may be embodied as an N:1 Wilkinson combiner or a collection of power combiners with less inputs that are arranged in a multi-stage approach.

A distinction with the multi-channel approach, relative to the two channel approach described above, is that the multi-tone signal provided on the outputs of the signal processing circuitry 110 may have a pre-amplification signal tone power of ($P_1*(1/N)$) or $P_1/N$. As such, the signals provided at the outputs of the signal processing circuitry 110 may be represented by ($f_1$, $P_1/N$; $f_2$, $P_1/N$, . . . ; $f_N$, $P_1/N$) where N is the number of channels or processor outputs being utilized. Additionally, similar to the description above, the outputs of the amplifiers may have an identical (or substantially identical signal) ($f_1$, $\sim P_2/N$; $f_2$, $\sim P_2/N$, . . . ; $f_N$, $\sim P_2/N$; IMD; harmonics). Since the power combiner 140 may still coherently combine the signals, the signal provided to antenna 150 may be represented by ($f_1$, $\sim P_2$; $f_2$, $\sim P_2$, . . . ; $f_N$, $\sim P_2$; IMD; harmonics) where the individual power levels are multiplied by N through the power combiner.

As described above, the signal processing circuitry 110 may be configured to prepare the multi-tone signal for provision to the amplifiers, power combiner, and antenna. In this regard, the signal processing circuitry 110 may interact with or embody a memory 112 and a processor 111. The signal processing circuitry 110 is configurable to perform operations described herein. In this regard, the signal processing circuitry 110 may be configured to perform computational and signal processing and memory management according to an example embodiment. In some embodiments, the signal processing circuitry 110 may be embodied as a chip or chip set. In other words, the signal processing circuitry 110 may comprise one or more physical packages (e.g., chips) including materials, components or wires on a structural assembly (e.g., a baseboard). The signal processing circuitry 110 may be configured to receive inputs (e.g., via peripheral components), perform actions based on the inputs, and generate outputs (e.g., for provision to peripheral components, such as amplifiers). In an example embodiment, the signal processing circuitry 110 may include one or more instances of a processor 111, associated circuitry, and memory 112. As such, the signal processing circuitry 110 may be embodied as a circuit chip (e.g., an integrated circuit chip, such as a field programmable gate array (FPGA)) configured (e.g., with hardware, software or a combination of hardware and software) to perform operations described herein.

In an example embodiment, the memory 112 may include one or more non-transitory memory devices such as, for example, volatile or non-volatile memory that may be either fixed or removable. The memory 112 may be configured to store information, data, applications, instructions or the like for enabling the signal processing circuitry 110 to carry out various functions in accordance with exemplary embodiments. For example, the memory 112 could be configured to buffer input data for processing by the signal processing circuitry 110. Additionally or alternatively, the memory 112 could be configured to store instructions for execution by the signal processing circuitry 110. Among the contents of the memory 112, applications may be stored for execution by the signal processing circuitry 110 in order to carry out the functionality associated with each respective application.

As mentioned above, the signal processing circuitry 110 may be embodied in a number of different ways. For example, the signal processing circuitry 110 may be embodied as various processing means such as one or more processors 111 that may be in the form of a microprocessor or other processing element, a coprocessor, a controller or various other computing or processing devices including integrated circuits such as, for example, an ASIC (application specific integrated circuit), an FPGA, or the like. In an example embodiment, the signal processing circuitry 110 may be configured to execute instructions stored in the memory 112 or otherwise accessible to the signal processing circuitry 110. As such, whether configured by hardware or by a combination of hardware and software, the signal processing circuitry 110 may represent an entity (e.g., physically embodied in circuitry—in the form of signal processing circuitry 110) capable of performing operations according to example embodiments while configured accordingly. Thus, for example, when the signal processing circuitry 110 is embodied as an ASIC, FPGA, or the like, the signal processing circuitry 110 may be specifically configured hardware for conducting the operations described herein.

Alternatively, as another example, when the signal processing circuitry 110 is embodied as an executor of software instructions, the instructions may specifically configure the signal processing circuitry 110 to perform the operations described herein.

In an example embodiment, the signal processing circuitry 110 may be operate to permit the wireless transmitters 100, 200 to high power transmission using multi-tone signals. In this regard, the signal processing circuitry 110 may be configured to provide a data stream for each processor output of the signal processing circuitry 110. A data stream may be generated from a data set for a given channel. The signal processing circuitry 110 may be configured to modulate each data stream with a carrier tone, $f_N$, to generate modulated data streams as incoherent signals. The signal processing circuitry 110 may be further configured to form a multi-tone signal based on the modulated data streams in the form of incoherent signals, and output the multi-tone signal on each of the processor outputs for provision. To form the multi-tone signals at the signal processing circuitry 110, the signal processing circuitry 110 may be configured to combine the incoherent signals, using for example, a combiner such as a mixer or a Wilkinson combiner implemented on the signal processing circuitry 110. Because the power levels of these incoherent signals combined at the signal processing circuitry 110 are small the loss of power associated is negligible, particularly since the combined multi-tone signals will be provided to the amplifiers to increase the signal power. After being amplified by the amplifier, the multi-tone signals may be provided to the power combiner for coherent combination of the multi-tone signals by the power combiner and wireless transmission via the antenna.

According to some example embodiments, a power associated with each carrier tone in the multi-tone signal is based on the number of processor outputs or channels, N. Further, according to some example embodiments, the power associated with each carrier tone of the multi-tone signal is $P_1*1/N$ or $P_1/N$, where $P_1$ is a predetermined pre-amplification single tone power and N is a number of processor outputs. The amplifiers may operate in a non-linear mode when the input power level is $P_1*1/N$. Further, an amplified power associated with each carrier tone of the multi-tone signal on the outputs of the amplifiers, may be $P_2*1/N$ or $P_2/N$ less losses, where $P_2$ is a predetermined full single tone amplified power and N is a number of processor outputs. A power for each carrier tone on the power combiner output, according to some example embodiments, may be a predetermined full single tone amplified power less losses. The losses may include intermodulation losses and harmonic losses.

Figure 3:
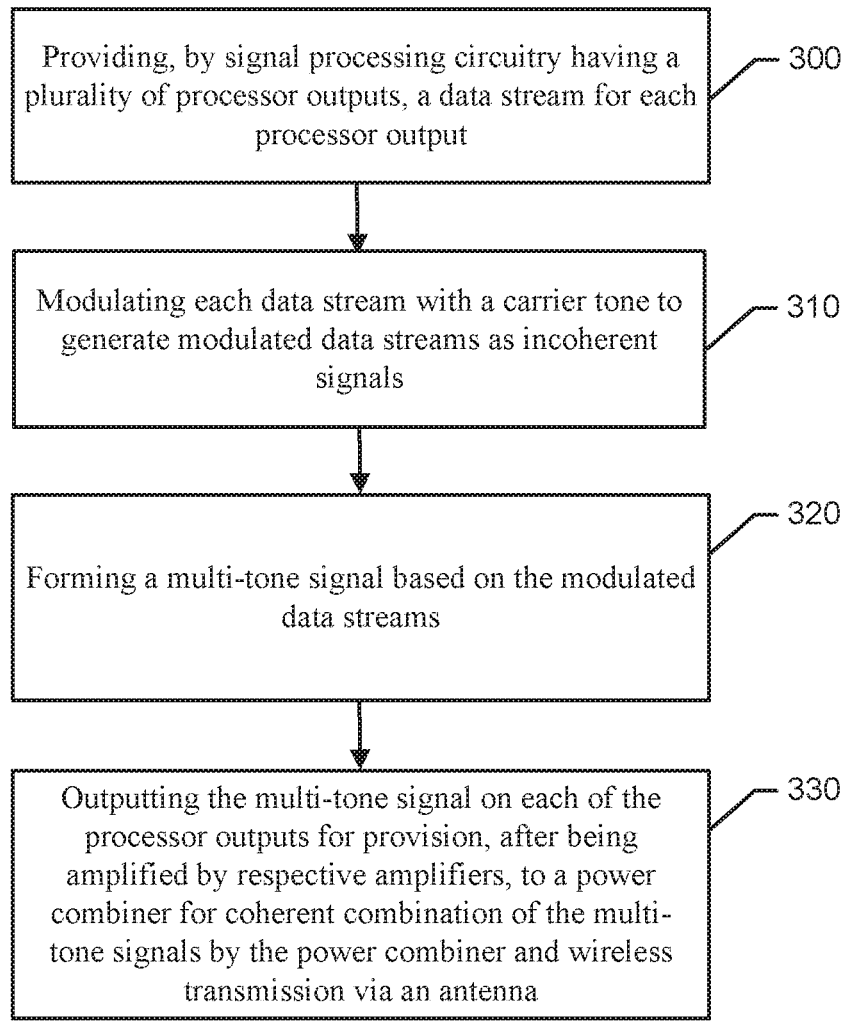
FIG. 3 shows an example method for high power transmission using multi-tone signals according to an example embodiment.

Referring now to FIG. 3, a block diagram flow chart of an example method for high power transmission using multi-tone signals is provided. The example method may be implemented by, for example, the wireless transmitter 200 and more specifically, the signal processing circuitry 110. In this regard, the example method may include, at 300, providing, by signal processing circuitry having a plurality of processor outputs, a data stream for each processor output, and at 310, modulating each data stream with a carrier tone to generate modulated data streams as incoherent signals. Further, the example method may include forming a multi-tone signal based on the modulated data streams at 320, and outputting the multi-tone signal on each of the processor outputs for provision, after being amplified by respective amplifiers, to a power combiner for coherent combination of the multi-tone signals by the power combiner and wireless transmission via an antenna, at 330.

According to some example embodiments, a power associated with each carrier tone in the multi-tone signal may be based on a number of processor outputs, or a power associated with each carrier tone of the multi-tone signal may be $P_1*1/N$, where $P_1$ is a predetermined pre-amplification single tone power and N is a number of processor outputs. The amplifiers may operate in a non-linear mode when the input power level is $P_1*1/N$. Further, in some example embodiments, an amplified power associated with each carrier tone of the multi-tone signal on outputs of the amplifiers may be $P_2*1/N$ less losses, where $P_2$ is a predetermined full single tone amplified power and N is a number of processor outputs. According to some example embodiments, a power for each carrier tone on an output of the power combiner may be a predetermined full single tone amplified power less losses.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements or functions, it should be appreciated that different combinations of elements or functions may be provided by alternative embodiments without departing from the scope of the appended claims. In this regard, for example, different combinations of elements or functions than those explicitly described above are also contemplated as may be set forth in some of the appended claims. In cases where advantages, benefits or solutions to problems are described herein, it should be appreciated that such advantages, benefits or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A wireless transmitter comprising:
    signal processing circuitry having a plurality of processor outputs,
    a plurality of amplifiers, each amplifier of the plurality of amplifiers having a respective amplifier input and a respective amplifier output, wherein each amplifier input is operably connected to a respective processor output of the processor outputs and wherein each amplifier operates in non-linear mode;
    a power combiner having a plurality of power combiner inputs and a power combiner output, wherein each power combiner input of the plurality of power combiner inputs is operably connected to a corresponding one of the respective amplifier outputs; and
    an antenna having an antenna input, wherein the antenna input is directly connected to the power combiner output;
    wherein the signal processing circuitry is configured to:
        provide a data stream for each processor output;

modulate each data stream with a carrier tone to generate modulated data streams as incoherent signals;

form a multi-tone signal for each data stream based on respective modulated data streams; and output each of the multi-tone signals to each respective one of the processor outputs for provision, after being amplified by each respective amplifier, to the power combiner for coherent combination of the multi-tone signals by the power combiner and wireless transmission via the antenna, each multi-tone signal outputted from each respective one of the amplifiers amplifier comprising harmonics based on each respective one of the amplifiers operating in non-linear mode.

2. The wireless transmitter of claim 1, wherein a power associated with each carrier tone in the multi-tone signal is based on a number of processor outputs.

3. The wireless transmitter of claim 1, wherein a power associated with each carrier tone of the multi-tone signal is $P_1*1/N$, where $P_1$ is a predetermined pre-amplification single tone power and N is a number of processor outputs.

4. The wireless transmitter of claim 1, wherein an amplified power associated with each carrier tone of the multi-tone signal on the outputs of the amplifiers, is $P_2*1/N$ less losses, where $P_2$ is a predetermined full single tone amplified power and N is a number of processor outputs.

5. The wireless transmitter of claim 1, wherein a power for each carrier tone on the power combiner output is a predetermined full single tone amplified power less losses.

6. The wireless transmitter of claim 5, wherein the losses include intermodulation losses and harmonic losses.

7. The wireless transmitter of claim 1, wherein the power combiner is a Wilkinson combiner.

8. The wireless transmitter of claim 1, wherein at least the signal processing circuitry is embodied in an field programmable gate array (FPGA).

9. A wireless transmitter comprising:
signal processing circuitry having a first processor output and a second processor output,
a first amplifier and a second amplifier, the first amplifier having a first amplifier input and a first amplifier output, the second amplifier having a second amplifier input and a second amplifier output, wherein the first amplifier input is operably connected to the first processor output and the second amplifier input is operably connected to the second processor output and wherein the first amplifier and the second amplifier operate in non-linear mode;
a power combiner having a first power combiner input, a second power combiner input, and a power combiner output, wherein the first power combiner input is operably connected to the first amplifier output and the second power combiner input is operably connected to the second amplifier output; and
an antenna having an antenna input, wherein the antenna input is directly connected to the power combiner output;
wherein the signal processing circuitry is configured to:
provide a first data stream for the first processor output and provide a second data stream for the second processor output;
modulate the first data stream with a first carrier tone to generate a first modulated data stream and modulate the second data stream with a second carrier tone to generate a second modulated data stream, the first modulated data stream and the second modulated data stream being incoherent signals;
form a first multi-tone signal based on the first modulated data stream and form a second multi-tone signal based on the second modulated data stream; and
output the first multi-tone signal on the first processor output and the second multi-tone signal on the second processor output for provision, after being amplified by the first amplifier and the second amplifier, respectively, to the power combiner for coherent combination by the power combiner and wireless transmission via the antenna, the first and second multi-tone signals respectively outputted from the first and second amplifiers each comprising harmonics based on the first amplifier and the second amplifier operating in non-linear mode.

10. The wireless transmitter of claim 9, wherein a first power associated with the first carrier tone of the multi-tone signal is $P_1*½$, where $P_1$ is a predetermined pre-amplification single tone power and a second power associated with the second carrier tone of the multi-tone signal is $P_1*½$.

11. The wireless transmitter of claim 9, wherein a first amplified power associated with the first carrier tone of the first multi-tone signal at the first amplifier output is $P_2*½$ less losses, where $P_2$ is a predetermined full single tone amplified power and a second amplified power associated with the second carrier tone of the second multi-tone signal at the second amplifier output is $P_2*½$ less losses.

12. The wireless transmitter of claim 9, wherein a post-combiner power for the first carrier tone on the power combiner output is a predetermined full single tone amplified power less losses and a post-combiner power for the second carrier tone on the power combiner output is the predetermined full single tone amplified power less losses.

13. The wireless transmitter of claim 12, wherein the losses include intermodulation losses and harmonic losses.

14. The wireless transmitter of claim 9, wherein the power combiner is a Wilkinson combiner.

15. The wireless transmitter of claim 9, wherein at least the signal processing circuitry is embodied in a field programmable gate array (FPGA).

16. A method comprising:
providing, by signal processing circuitry having a plurality of processor outputs, a data stream for each processor output of the plurality of processor outputs;
modulating each data stream with a carrier tone to generate modulated data streams as incoherent signals;
forming multi-tone signals based on the modulated data streams; and
outputting the multi-tone signals on each of the processor outputs for provision, after being amplified by respective amplifiers operating in non-linear mode, to a power combiner for coherent combination of the multi-tone signals by the power combiner and wireless transmission via an antenna directly connected to the power combiner, the multi-tone signals outputted from the respective amplifiers comprising harmonics.

17. The method of claim 16, wherein a power associated with each carrier tone in the multi-tone signal is based on a number of processor outputs.

18. The method of claim 16, wherein a power associated with each carrier tone of the multi-tone signal is $P_1*1/N$, where $P_1$ is a predetermined pre-amplification single tone power and N is a number of processor outputs.

19. The method of claim 16, wherein an amplified power associated with each carrier tone of the multi-tone signals on respective outputs of the amplifiers is $P_2*1/N$ less losses, where $P_2$ is a predetermined full single tone amplified power and N is a number of processor outputs.

20. The method of claim 16, wherein a power for each carrier tone on an output of the power combiner is a predetermined full single tone amplified power less losses.

* * * * *